United States Patent [19]

Nakamoto et al.

[11] 3,870,418

[45] Mar. 11, 1975

[54] EXPOSURE METER

[75] Inventors: Soichi Nakamoto, Machida; Takeshi Yanagisawa, Kawasaki, both of Japan

[73] Assignee: Canon Kabushiki Kaisha, Tokyo, Japan

[22] Filed: June 23, 1972

[21] Appl. No.: 265,520

[30] Foreign Application Priority Data
June 25, 1971    Japan.............................. 46/46125

[52] U.S. Cl.................... 356/226, 356/223, 354/24, 250/214
[51] Int. Cl............................. G01j 1/44, G01j 1/42
[58] Field of Search.......... 356/218, 219, 226, 223; 307/310, 311; 250/214; 354/23, 24, 29

[56] References Cited
UNITED STATES PATENTS

| | | | |
|---|---|---|---|
| 3,147,680 | 9/1964 | Stimson | 356/219 |
| 3,221,317 | 11/1965 | Ferrigno, Jr. | 307/311 X |
| 3,393,604 | 7/1968 | Lundin | 307/311 X |
| 3,450,888 | 6/1969 | Spangler | 250/214 |

Primary Examiner—Ronald L. Wibert
Assistant Examiner—Conrad Clark
Attorney, Agent, or Firm—Toren and McGeady

[57] ABSTRACT

An exposure meter comprising a transistor, a photoconductive element and a power source battery, both being connected in series between the emitter and the collector of said transistor, and an exposure meter circuit connected between the collector and the base of said transistor.

2 Claims, 4 Drawing Figures

EXPOSURE METER

The present invention relates to an exposure meter to obtain an optimum exposure value at the time of photographing and more particularly relates to such an exposure meter of an evenly calibrated meter type in which the indication values of an ammeter are made to be in proportion to the logarithm of the intensity of illumination.

An exposure meter for obtaining an optimum exposure value by measuring the intensity of illumination of an object is generally of such type that a photoconductive element is combined with an ammeter. In this kind of exposure meter such a device is desirable that evenly spaced calibration is provided against the EV values to represent the intensity of illumination. Generally speaking the variation of resistance value of a photo-conductive element such as CdS varies in an exponential (indexlike) manner against EV values, and when said element is combined with an ordinary ammeter, the indication value will not have even spacing against EV thus it is difficult to place the same in practical use. In this regard, German Laid-Open Specification No. 1809900 shows such a device that the variation of the current which flows through a photoconductive element such as CdS is made to have its voltage converted by a non-linear element and at the same time logarithmically compressed to obtain an indication in an evenly calibrated meter. However the conventional device in which the current flowing through a photo-electric element is made to have its voltage converted and at the same time is compressed using diode characteristics of a diode or a transistor has had such disadvantages that as the current flowing through a photo-electric element is made to have its voltage converted, the current flowing through a photoelectric element is logarithmically compressed in a linear form thus it has been difficult to have the meter swing precisely.

The object of the present invention is to provide an exposure meter in which the above-mentioned disadvantages are eliminated and the invention is characterized by logarithmically compressing the current flowing through a photo-conductive element in a linear manner to have a meter to swing.

Figure 1:
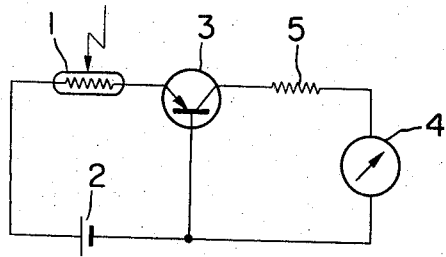
FIG. 1 is a circuit diagram to show the first example of an exposure meter according to the present invention.

Now the present invention shall be explained in detail referring to the drawings. FIG. 1 is a circuit diagram to show an exposure meter using a transistor, indicating the first example of the present invention. In the drawing, 1 is a photo-conductive element to receive light from an object and thereby having its resistance value varied. 2 is a power source battery, 3 is a transistor, 4 is an ammeter to indicate the exposure value, and 5 shows the inner resistance of the ammeter 4.

Figure 2:
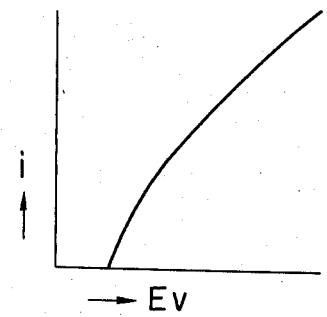
FIG. 2 shows a characteristic curve indicating the relationship between the intensity of illumination in the exposure meter and the current.

In this drawing, the logarithm of the current through the photoconductive element (CdS) varies in linear manner in proportionate to the amount of light entering into the element, that is, the intensity of illumination (EV value) of an object. The resulting current flowing between the base and the emitter of the transistor 3 is compressed by the diode characteristics of the transistor, and such current flows through the collector as being proportionate to the logarithm of the intensity of illumination. FIG. 2 shows a curve indicating an example of the characteristics of the device. In the drawing, the abscissa shows the intensity of illumination (EV value), and the ordinate shows the current ($i$) of the ammeter, wherein it is shown that the current varies in a linear manner against the intensity of illumination. However, the characteristic curve comes off the linear position at lower EV zone. In the second example the variation in lower intensity of illumination is compensated.

Figure 3:
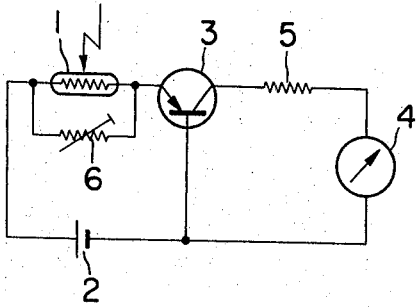
FIG. 3 is a circuit diagram to show the second example of an exposure meter according to the present invention.
Figure 4:
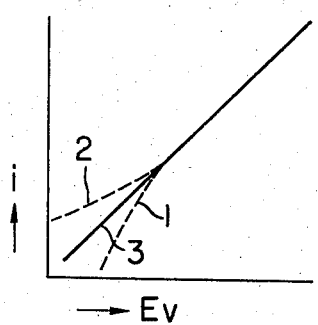
FIG. 4 shows characteristics curves of the exposure meter of FIG. 3.

Now, the second example shall be explained referring to FIG. 3 and FIG. 4. In the drawings, the same elements as in FIG. 1 are indicated by the same identification marks. 6 is a resistance element for adjustment and is connected in parallel with the photo-conductive element 1. Now, when the resistance value of the photo-conductive element 1 is represented by Rcds and the resistance value of the resistance 6 is represented by R, the synthesis resistance $R_T$ of the parallel circuit will be:

$$R_T = (R \cdot Rcds/R + Rcds) = [R/1 + (R/Rcds)]$$

If R is so selected as Rcds >> R, the synthesis resistance at such case will be $R_T \approx R$, and in case of large intensity of illumination $R_T \approx Rcds$. FIG. 4 shows a curve indicating an example of characteristics in an exposure meter of the present invention, wherein the curve 1 shows the case when the adjusting resistance R is set at infinite, while the curve 2 shows the case when it is set at small value. As shown in the drawings, by suitably selecting the value of R the variation in the characteristics can be made to take a linear form for a considerably wide extent as shown by the curve 3 being represented by a solid line.

As explained above, in the present invention meter indication in an linear relationship with EV value can be obtained for a considerably wide extent by quite a simple circuit, thus it is useful for application to an exposure meter built in a camera, etc.

While PNP type transistor is used in the examples shown in FIG. 1 and FIG. 3, NPN type transistor can be used in place.

What is claimed is:

1. A light exposure indication system comprising a transistor having emitter, base, and collector electrodes; current indicating means connected between said collector and base electrodes for indicating current therethrough, a DC voltage source and a photosensitive element connected in series between said base and emitter electrodes; said DC voltage source being the only biasing potential for said transistor.

2. A system as defined in claim 1, further comprising resistance means connected in shunt with the photosensitive element.

* * * * *